United States Patent Office 3,196,429
Patented July 20, 1965

3,196,429
DIGITAL TO ANALOG CONTINUOUS ROTATION SERVO
Robert D. Gross, New York, and George Garbarini, Flushing, N.Y., assignors to Sperry Rand Corporation, Ford Instrument Company Division, Wilmington, Del., a corporation of Delaware
Filed Feb. 21, 1961, Ser. No. 90,679
1 Claim. (Cl. 340—347)

This invention relates to digital to analog converters capable of transforming digital information in pulse form into analog voltages. Hitherto there has had to be provided fairly elaborate and complex circuit arrangements and components so as to afford the capability of making this conversion, these systems usually requiring that the output voltage be represented as three-phase analogs which are employed to drive a three-phase synchro follower device. The need for developing the three-phase voltages contributed largely to the complexity of the system. According to this invention, there is provided a continuous rotation potentiometer as the response component for a servo system. It has been found that the employment of this component results in a system which is functionally different and is of unusually simple and compact design as compared with systems which have been hitherto used for the same purpose. Special expedients are incorporated in the invented system to overcome servo problems inherent in the use of a continuous rotation potentiometer and, additionally, the servo system includes an error detector and relay device which assure that the direction of potentiometer operation will be the same as the change in digital command signal.

One object of the invention is to provide a simple and compact arrangement for transforming digital to analog information.

Another object of the invention is to provide a digital to analog converter which employs a continuous rotation servo system having a limited slew speed and a control therefor which insures its proper direction of operation relative to the applied command signals, the system being, therefore, well adapted for transmitting azimuth commands to the autopilot of a ground controlled drone.

Figure 1:
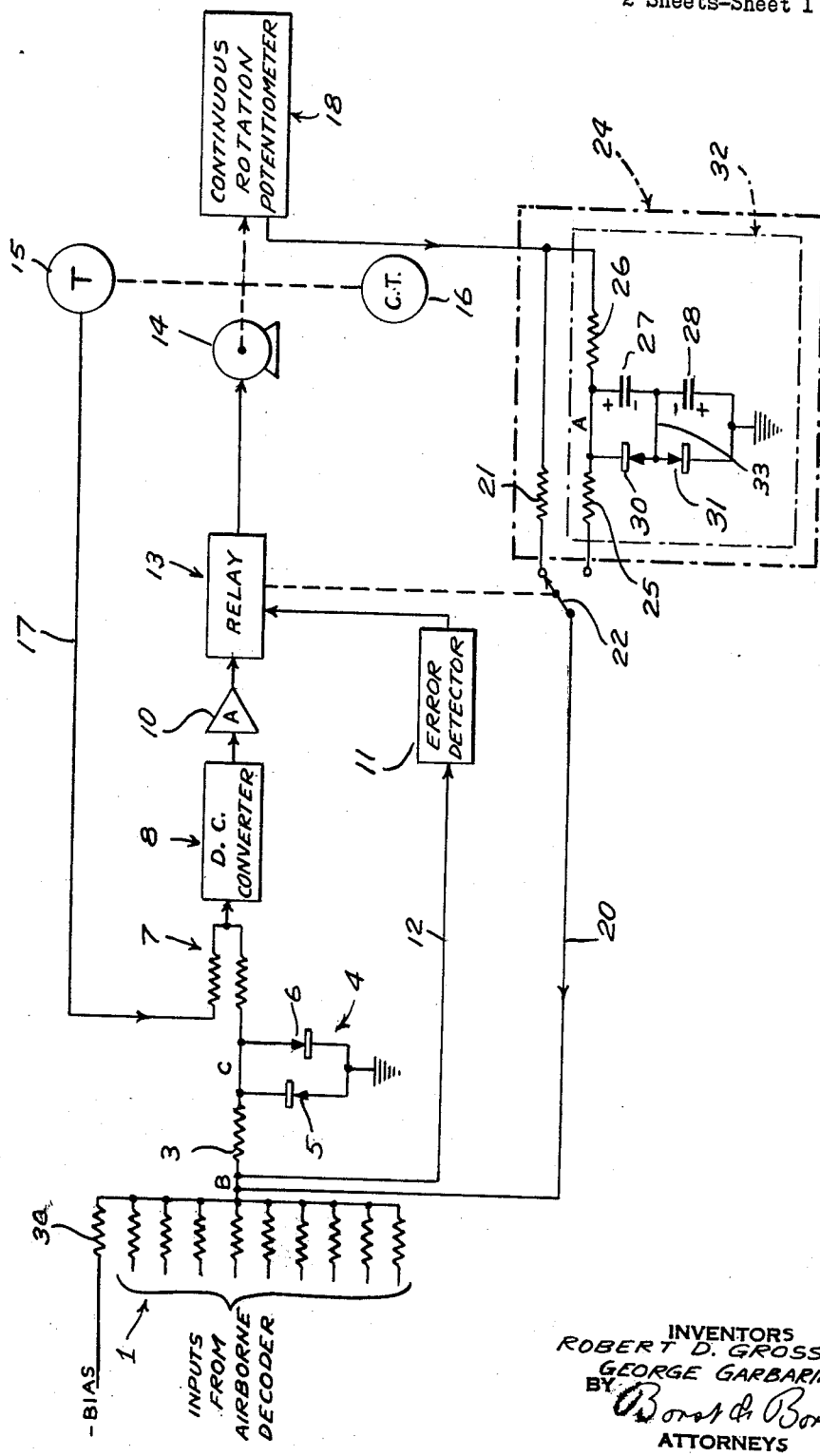
Figure 2:
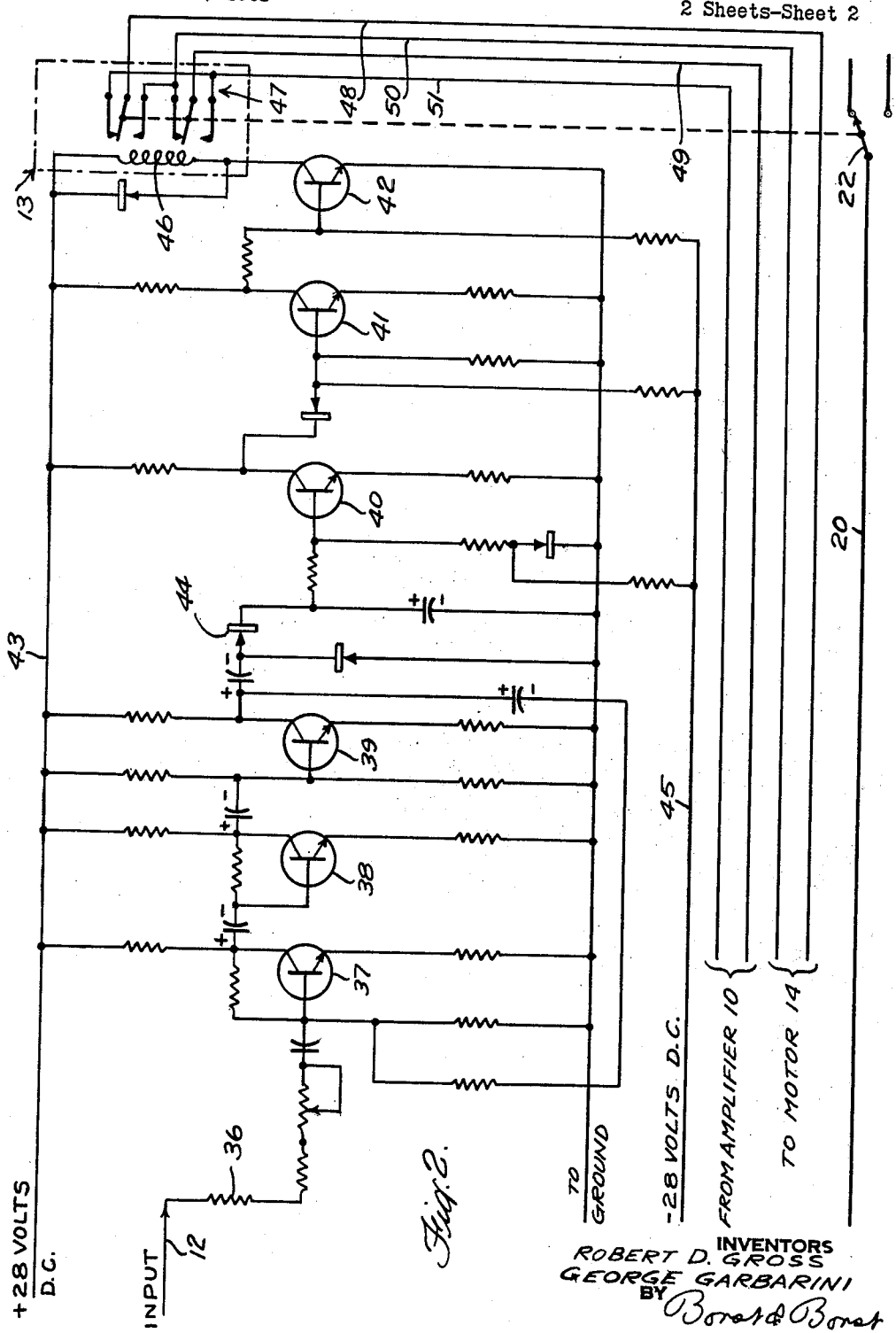

Other objects and advantages of the invention may be appreciated on reading the following detailed description of one of its embodiments which is taken in conjunction with the accompanying drawings in which FIG. 1 is a block diagram illustrating the digital to analog converting system, and FIG. 2 is a schematic showing the error detector and relay control for the servo motor in the servo system.

As indicated in the drawing the input to the converter, which is representative of an azimuth command, is derived from a decoder in the remote airborne equipment and is digital in the sense that the input is in pulse form. An input network 1 is provided to receive the command signal and comprises a plurality of resistive legs, the weight of each leg being determined by the resolution of the input commands which may be, as in this case, 1 in 100. The amplitude of the input pulses to each leg is normally constant with any combination up to five legs receiving information simultaneously. The voltage output at point B represents the servo error voltage which is isolated from point C by means of resistor 3 which is a servo error determining unit and is then clipped by means of diode clamping network 4, the latter consisting of half-wave diode 5 and half-wave diode 6. The two diodes are connected in parallel and oppositely poled between point C located on the output side of the resistor 3 and ground. The clipped voltage is then fed to one side of adding network 7, the other side of which receives a voltage proportional to the servo output rate. A D.C. converter 8 is connetced to the output of adding network 7. The output of the converter 8 drives an amplifier 10 whose output goes to a motor 14 through a relay 13. The relay 13 is controlled by an error detector 11 which serves to control the phase of the input voltage to the servo motor 14, the error detector 11 being controlled by point B through a lead 12. A tachometer 15 and control transformer 16 are driven by the servo motor 14, the transformer being utilized to transmit the actual azimuth commands to the drone autopilot. The tachometer 15 is connected by means of lead 17 to one side of the adding network 7 as aforementioned.

In order to use the medium range output of the tachometer output, a gear ratio of 4320:1 is used between the motor and control transformer, the control transformer being geared 1:1 with respect to the continuous rotation potentiometer (gearing not shown).

The two resistors in the adding network 7 add the output of the tachometer and the clamping network 4. The tachometer is not used for stabilization but as a means of obtaining the required slew speed. The servo error voltage produced at point C is clamped by the network 4 so that there is available a constant voltage against which the tachometer output can be bucked in order to obtain the desired slew speed. The tachometer output is so adjusted that the output of network 7 will permit the servo to travel at the desired slew speed of 3.25 degrees/sec.

The D.C. converter 8 serves to convert the D.C. servo error voltage to an A.C. voltage for driving the servo motor 14. A continuous rotation potentiometer 18 is driven by the servo motor 14. The output from the continuous rotation potentiometer is fed back to point B through a feedback network 24 and lead 20. The feedback network 24 comprises two legs which are connected to the lead 20 by means of a switch 22 which is controlled by the relay 13. One leg of feedback network 24 contains a resistor 21 and the other leg of the network consists of an integrating network 32. The integrating network consists of two resistors 25 and 26 connected in series and two parallel leads connected between the junction point A of the two resistors and ground, one of the parallel leads containing two diodes, 31 and 32, back to back, and the other lead containing two series connected polarized capacitors 27 and 28. A jumper lead 33 ties the junction points of the diodes and capacitors together.

The continuous rotation potentiometer employed in this system is shown in Patent No. 2,850,604, issued on September 2, 1958. With the input commands having a resolution of 1 in 100 each finite command would be representative of 3.6° of azimuth. Since the response potentiometer must have continuous rotation, and since continuous rotation potentiometers are electrically open for nominally six mechanical degrees of rotation, one and possibly two of the 100 steps would not be obtainable with this type of potentiometer. Therefore, the potentiometer disclosed in the said patent is used as the response element embodied in this system. The output waveform of the potentiometer is saw-tooth for the entire 360° of mechanical rotation and repeats itself for each revolution.

In order to keep the continuous rotation potentiometer 18 away from the bottom of its transition, which would occur at a command of zero, a bias leg 30 is employed in the input network 1 and excited with a negative potential. Accordingly, for a command of zero the potentiometer is 1.8° away from its lower transition, and for a command of 99 it is 1.8° away from its upper transition. This biasing is required in order to prevent the servo from oscillating around the transition for a zero command. However, as will be explained later, the integrating network 32 is also required to prevent hunting at the transition point.

The error detector 11 and relay 13 are employed to drive the continuous rotation potentiometer in the same direction as the new azimuth command. In order to achieve this objective, the error detector is so arranged that when it senses errors which are greater than one half the maximum servo error possible in the system it actuates relay 13 so that the control signal to the motor is reversed. By this means the potentiometer is driven in the same direction as the command signal which is applied to the system. If it is assumed that the lower transition of the potentiometer 18 is representative of a north heading then the movement away from its lower transition in a clockwise direction would be indicative of azimuth changing successively from north to east to south to west. Additionally if it be assumed that the potentiometer is resting at a heading a few degrees east of north and a new azimuth is commanded which is a few degrees west of north, the potentiometer would move clockwise to the new heading if the error detector were not present. However, with the error detector present, an error is sensed which is greater than one half the maximum error possible in the servo system. The error detector, therefore, reverses the control signal to the motor by means of the relay with the result that the potentiometer moves counterclockwise towards the new position which is the desired direction for the potentiometer movement since it is the same as that of the command signal. At the instant the potentiometer moves across the transition to the high potential terminal, the servo error drops from a level above one half to a considerably low level. Consequently, the control signal to the motor reverses again to its normal condition and the potentiometer continues in the counterclockwise direction until the servo reaches a null. It is, accordingly, seen that the error detector allows the continuous rotation potentiometer to move through its transition from either direction and the servo is thereby enabled to meet the requirement of moving in the same direction as the new azimuth command regardless of what the present azimuth is.

A schematic diagram of the error detector 11 and relay 13 is set forth in FIG. 2. As shown therein, the potential of the error point B is applied to one side of resistor 36 by means of the lead 12. The error detector 11 basically amplifies the error signal and controls the state of relay 13. If the error at point B is less than one half of the maximum possible servo error then the amplified signal voltage coming from transistor 42 to the relay coil 46 isn't large enough to energize the relay 13 and the voltage on leads 49 and 50, which come from amplifier 10, go through the relay contacts to the motor 14 by means of leads 50 and 48, respectively. When the error at point B is greater than one half of the maximum possible servo error then the amplified signal voltage coming from transistor 42 to the relay coil 46 is large enough to energize the relay 13 and the voltage on leads 49 and 50 now go through the relay contacts to the motor by means of leads 48 and 50, respectively. In this manner the output of the amplifier 10 to the control phase of the servo motor 14 is reversed.

The error detector 11 consists of a plurality of transistors 37, 38, 39, 40, 41 and 42, transistors 37, 38 and 39 acting as one section of an amplifier and transistors 40, 41 and 42 acting as a second section of an amplifier. Lead 43 carries a 28 volt D.C. voltage supply to the collector electrodes of transistors 37, 38, 39, 40 and 41. Lead 45 carries a −28 volt D.C. voltage supply to the base electrodes of tranistors 40, 41 and 42 as a bias voltage. The emitter electrodes of transistors 37, 38, 39, 40, 41 and 42 are connected to ground through a resistor for changing the potential level except for resistor 42 which is directly connected to ground, resistor 42 being the power transistor. A half wave diode 44 is provided between the two stages of the error detector for preventing signals of less than a predetermined level from passing through.

As stated previously, biasing the servo provides one precaution against servo hunting around the transition which occurs between its two terminals. As a further precaution, there is provided in the feedback phase of the system the integrating network 32 which is made necessary by the fact that the error detector has an inherent delay due to its relay. The integrating network functions to introduce a delayed holding voltage corresponding to the high servo error voltage which serves to keep the error detector energized while the potentiometer is passing through the transition. Otherwise the low servo error voltage occuring when the potentiometer voltage nears the command signal would allow the servo to hunt around the terminal disposed on the signal side of the transition. For this purpose, the integrating network provides a high time constant. Further the network is arranged so as to provide the required delay whether the voltage at point A is above or below the ground potential.

In operation, the integrating network operates as follows:

When the continuous rotation potentiometer is resting at a heading that is a few degrees east of north, and a new azimuth is commanded which is a few degrees west of north, the potentiometer moves counterclockwise to the new command. Concurrent with reversing the direction of rotation of the servo, the error detector switches out the feedback resistor 21 and switches in the integrating network 32. The potential at point A is essentially at ground when the new command is given since the potentiometer is positioned at its lower transition. Since the command signal is at a high negative level, the servo error voltage is, therefore, near its maximum negative level. Capacitor 28 begins to charge to this negative potential as the potentiometer moves counterclockwise. The error detector remains switched in the circuit since the error voltage is greater than one half the maximum servo error possible. When the potentiometer crosses the transition to its high potential terminal, at which point the detector would ordinarily drop out because of the drop in the servo error voltage, the detector is in fact maintained in the circuit. This is due to the fact that the positive charging of the capacitor 27 from the potentiometer is delayed. However, as this capacitor becomes charged the error voltage is reduced below the threshold value of the detector which will then drop out of the circuit at which time the potentiometer has been driven past the positive terminal and hunting at that point is precluded. With the detector out of the circuit, the control phase to the servo motor will be excited in the normal manner once again and the servo motor will continue in the same direction to the command. In a similar manner if the potentiometer is resting a few degrees west of north and a new azimuth command is inserted which is a few degrees east of north, the potentiometer will move through the transition. In this case, however, the capacitor 27 will discharge through the resistor 26 and the network 1 towards ground potential. When the potential applied to the network 1 is reduced to the point where the servo error is below half the maximum possible error, as governed by the discharge curve of the network, the error detector will drop out and normal servo action will take place.

Various modifications of the digital to analog converter may be effected by persons skilled in the art without departing from the scope and principle of the invention as defined in the appended claim.

What is claimed is:

A digital to analog converter comprising a servo network, said servo network including an adding network, a polarity determining relay and servo motor connected in series, an error detector, the input side of said servo network being connected to one side of the detector the other side of which is connected to said relay, a continuous rotation potentiometer connected to the output of said servo motor, a switch mechanically connected to said relay for actuation thereby, a feed back line connected between said switch and the input of said servo network, an integrating network having one side thereof connected to the output side of said potentiometer, said switch being operative to selectively connect said feed back line directly to the output side of said potentiometer or to the other side of said integrating network in accordance with the state of said polarity determining relay as controlled by said error detector, whereby the output of said potentiometer is fed directly back to the input of said servo network or back through said integrating network.

References Cited by the Examiner

UNITED STATES PATENTS

| | | | |
|---|---|---|---|
| 2,786,169 | 3/57 | Muffly | 318—29 |
| 2,861,233 | 11/58 | McKeown | 318—29 |
| 2,889,505 | 6/59 | Sigel | 340—347 |
| 2,988,681 | 6/61 | Bower | 340—347 |
| 2,993,157 | 7/61 | Bradley | 340—347 |

MALCOLM A. MORRISON, *Primary Examiner.*

STEPHEN W. CAPELLI, *Examiner.*